United States Patent
Wu et al.

(10) Patent No.: US 12,413,858 B2
(45) Date of Patent: Sep. 9, 2025

(54) ELECTRONIC DEVICE AND GAIN CALIBRATION METHOD FOR IMAGE STABILIZATION FUNCTION THEREOF

(71) Applicant: ASUSTeK COMPUTER INC., Taipei (TW)

(72) Inventors: Jo-Fan Wu, Taipei (TW); Wen-Ling Lin, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 89 days.

(21) Appl. No.: 18/467,743

(22) Filed: Sep. 15, 2023

(65) Prior Publication Data
US 2024/0292098 A1     Aug. 29, 2024

(30) Foreign Application Priority Data
Feb. 23, 2023   (TW) .................. 112106576

(51) Int. Cl.
*H04N 23/68*   (2023.01)
*H04N 17/00*   (2006.01)

(52) U.S. Cl.
CPC ....... *H04N 23/6812* (2023.01); *H04N 17/002* (2013.01); *H04N 23/6811* (2023.01); *H04N 23/683* (2023.01); *H04N 23/687* (2023.01)

(58) Field of Classification Search
CPC .................. H04N 23/6812; H04N 23/687
See application file for complete search history.

(56) References Cited

U.S. PATENT DOCUMENTS

| | | | |
|---|---|---|---|
| 11,190,689 B1* | 11/2021 | Wang | H04N 23/683 |
| 2004/0189814 A1* | 9/2004 | Katoh | H04N 23/683 |
| | | | 348/208.1 |
| 2007/0071424 A1* | 3/2007 | Poon | H04N 23/684 |
| | | | 396/246 |
| 2011/0102612 A1* | 5/2011 | Iwata | H04N 23/68 |
| | | | 348/208.4 |
| 2022/0294988 A1* | 9/2022 | Tabuchi | G02B 27/646 |
| 2022/0417437 A1 | 12/2022 | Kimura | |
| 2024/0340536 A1* | 10/2024 | Kim | H04N 23/00 |

FOREIGN PATENT DOCUMENTS

| | | |
|---|---|---|
| CN | 114339206 | 4/2022 |
| CN | 114353833 | 4/2022 |

\* cited by examiner

*Primary Examiner* — Cynthia Segura
(74) *Attorney, Agent, or Firm* — JCIPRNET

(57) ABSTRACT

The invention provides an electronic device and a gain calibration method for an image stabilization function thereof. The method includes the following. The image stabilization function is activated. A first image is generated by using a first gain through an image capturing device, and a first blur degree of the first image is obtained. A second image is generated by using a second gain through the image capturing device, and a second blur degree of the second image is obtained. A reference blur degree corresponding to the second gain is determined according to the second blur degree. A calibrated gain for the image stabilization function is determined according to a linear relationship established between the first blur degree corresponding to the first gain and the reference blur degree corresponding to the second gain.

15 Claims, 6 Drawing Sheets

ELECTRONIC DEVICE AND GAIN CALIBRATION METHOD FOR IMAGE STABILIZATION FUNCTION THEREOF

CROSS-REFERENCE TO RELATED APPLICATION

This application claims the priority benefit of Taiwan application serial no. 112106576, filed on Feb. 23, 2023. The entirety of the above-mentioned patent application is hereby incorporated by reference herein and made a part of this specification.

BACKGROUND

Technical Field

The disclosure relates to a gain calibration method for an image stabilization function and an electronic device using the method.

Description of Related Art

With the advancement of technology, electronic apparatuses with image capturing functions have filled the lives of modern people. If the electronic apparatus is in a vibrating or shaking state, there may be afterimages in the captured image, resulting in poor image quality. Therefore, in order to improve the above problems, an image stabilization function (also known as an anti-shake function or an anti-vibrate function) is developed to improve image quality.

Currently, the image stabilization function needs to apply a gyro gain to compensate the vibration of the electronic apparatus, so as to achieve the image stabilization function. Generally, camera module manufacturers provide preset gyro gains. However, due to factors such as assembly tolerances, mechanical stress, or component characteristic differences, the preset gyro gains provided by the camera module manufacturers are not optimal values that can provide the optimal image stabilization effect for assembled electronic apparatuses. Therefore, before the assembled electronic apparatus leaves the factory, it is generally necessary to calibrate the gyro gain again. Currently, in a traditional calibration process, a global search method is mostly used to find an optimal gyro gain. However, a traditional calibration method needs to test several different gyro gains one by one (for example, 10 gyro gains or more gyro gains), and then may search to get the best gyro gain according to a curve formed by picture capturing results of the different gyro gains. In this case, in order to calibrate gains applicable to respective electronic apparatuses, the traditional calibration process is time-consuming and inefficient.

SUMMARY

The disclosure provides a gain calibration method for an image stabilization function, which is used for an electronic device including an image capturing device, and the gain calibration method includes the following. The image stabilization function is activated. A first image is generated by using a first gain through the image capturing device, and a first blur degree of the first image is obtained. A second image is generated by using a second gain through the image capturing device, and a second blur degree of the second image is obtained. A reference blur degree corresponding to the second gain is determined according to the second blur degree. A calibrated gain for the image stabilization function is determined according to a linear relationship established between the first blur degree corresponding to the first gain and the reference blur degree corresponding to the second gain.

The disclosure also provides an electronic device, which includes an image capturing device and a processor. The processor is coupled to the image capturing device. The processor is configured to perform the following. The image stabilization function is activated. A first image is generated by using a first gain through the image capturing device, and a first blur degree of the first image is obtained. A second image is generated by using a second gain through the image capturing device, and a second blur degree of the second image is obtained. A reference blur degree corresponding to the second gain is determined according to the second blur degree. A calibrated gain for the image stabilization function is determined according to a linear relationship established between the first blur degree corresponding to the first gain and the reference blur degree corresponding to the second gain.

Based on the above, in the embodiment of the disclosure, when the image stabilization function is activated, the first image may be generated based on the first gain, and the second image may be generated based on the second gain. The first blur degree and the second blur degree may be generated respectively according to the first image and the second image. The reference blur degree may be determined according to the second blur degree. Thus, the linear relationship established between the first blur degree corresponding to the first gain and the reference blur degree corresponding to the second gain may be used to determine the calibrated gain. Based on this, not only can the image stabilization effect be ensured to be good, but also the gain calibration efficiency can be greatly improved.

DESCRIPTION OF THE EMBODIMENTS

Figure 1:
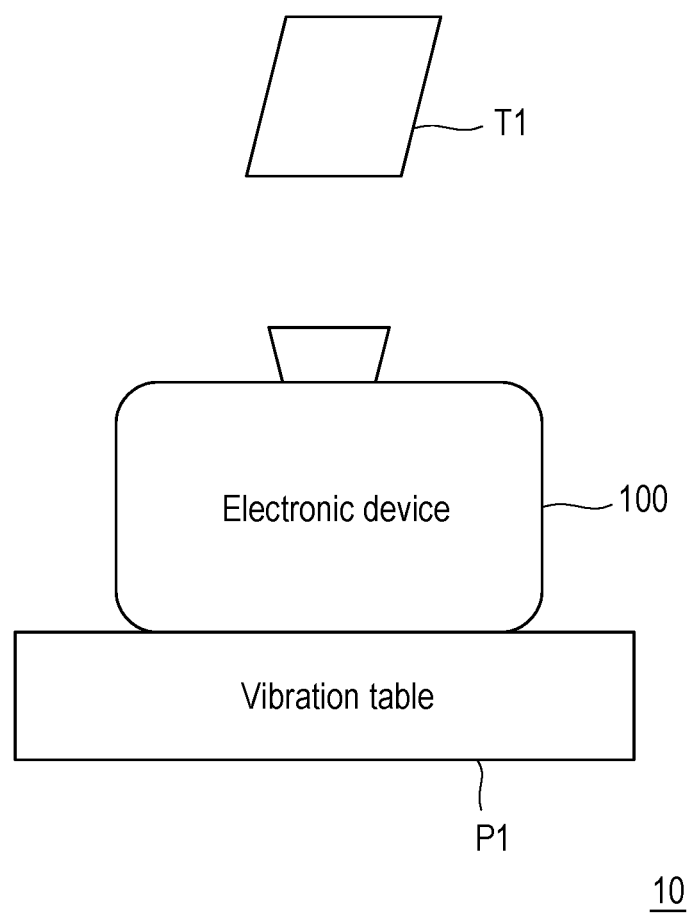
FIG. 1 is a schematic diagram illustrating a gain calibration system for an image stabilization function according to an embodiment of the disclosure.

Reference will now be made in detail to the exemplary embodiments of the disclosure, examples of the exemplary embodiments are illustrated in the accompanying drawings. Wherever possible, the same reference numerals are used in the drawings and descriptions to refer to the same or like parts. These embodiments are only a part of the disclosure, and do not reveal all possible implementations of the disclosure. Rather, these embodiments are merely examples of devices and methods within the scope of the disclosure.

Please refer to FIG. 1. A gain calibration system 10 for an image stabilization function may include an electronic device 100, a vibration table P1, and a test pattern T1.

The electronic device 100 may be, for example, a smart phone, a digital camera, a tablet computer, a game console, an electronic wearable device or a photographic device, etc., and various electronic devices with image capturing functions, and a type of the electronic device 100 is not limited thereto. It should be noted that the electronic device 100 has an image stabilization function, which may be an optical image stabilization (OIS) function or an electric image stabilization (EIS) function.

The electronic device 100 is disposed on the vibration table P1. The vibration table P1 may be a vibrating tool table, and is configured to fix the electronic device 100. The vibration table P1 may control the electronic device 100 to vibrate at a specific vibration frequency and a vibration angle. For example, to simulate a hand vibration state, the vibration frequency of the vibration table P1 may be set to 6 Hz. In some embodiments, the test pattern T1 may be presented on a drawing or carriers of other materials. In some embodiments, the test pattern T1 may comprise one or more vertical black lines and/or horizontal black lines, but the disclosure is not limited thereto. From another point of view, the test pattern T1 may be a drawing, a physical object, or a light projection pattern, and the disclosure is not limited thereto. The electronic device 100 on the vibration table P1 is suitable for capturing an image toward the test pattern T1, so as to calibrate a gain for the image stabilization function according to the captured image of the test pattern T1.

Figure 2:
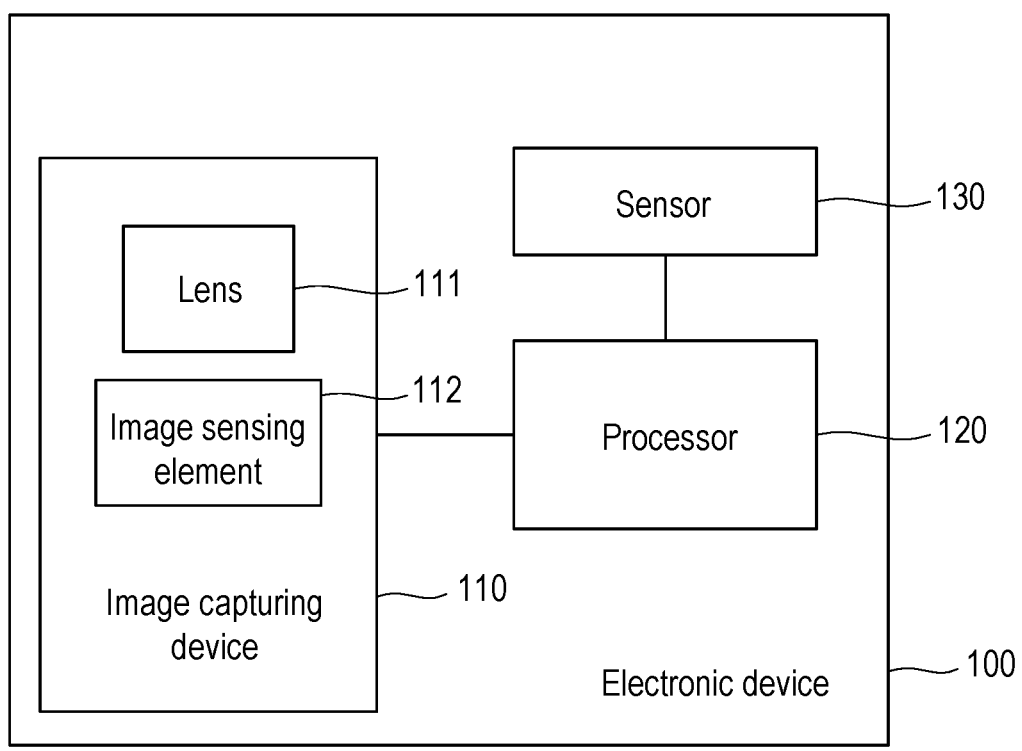
FIG. 2 is a schematic diagram illustrating an electronic device according to an embodiment of the disclosure.

Referring to FIG. 2, the electronic device 100 may include an image capturing device 110, a processor 120, and a sensor 130.

The image capturing device 110 is configured to capture images or videos, and may include a lens 111, an image sensing element 112, and other components. The lens 111 may include an optical lens element to perform light path control. The image sensing element 112 is configured to provide an image sensing function. The image sensing element 112 may include a photosensitive element, such as a charge coupled device (CCD), a complementary metal-oxide semiconductor (CMOS) element or other elements, and the disclosure is not limited thereto. The lens 111 may collect an imaging light on the image sensing element 112 to achieve the purpose of capturing the image. In some embodiments, when the electronic device 100 has the OIS function, the image capturing device 110 further includes components related to the OIS function, such as a drive unit for controlling a movement of the lens 111 and so on.

The processor 120 is coupled to the image capturing device 110 and the sensor 130, which is, for example, a central processing unit (CPU), an application processor (AP), or other programmable general-purpose or special-purpose microprocessors, a digital signal processor (DSP), an image signal processor (ISP), a graphics processing unit (GPU), or other similar devices, integrated circuits, or a combination thereof. In some embodiments, the processor 120 may execute commands or program codes in a memory to implement operations of a gain calibration method in the embodiments of the disclosure. The memory may include a volatile storage circuit and a non-volatile storage circuit.

The sensor 130 may be an inertial sensor, which is configured to sense a vibration and a movement of the electronic device 100. The sensor 130 may include an accelerometer or a gyro and the like. For example, the sensor 130 may be configured to sense an angular velocity generated by the vibration of the electronic device 100. A rotation angle and a rotation direction of the electronic device 100 may be calculated through performing integration or other mathematical operations on the angular velocity or a linear acceleration sensed by the sensor 130. Therefore, the processor 120 may perform the image stabilization function according to sensing data output by the sensor 130, such as adjusting a position of the lens 111, adjusting other capturing parameters (such as a shutter speed or an ISO value), or adjusting the captured image by using software algorithms.

Figure 3:
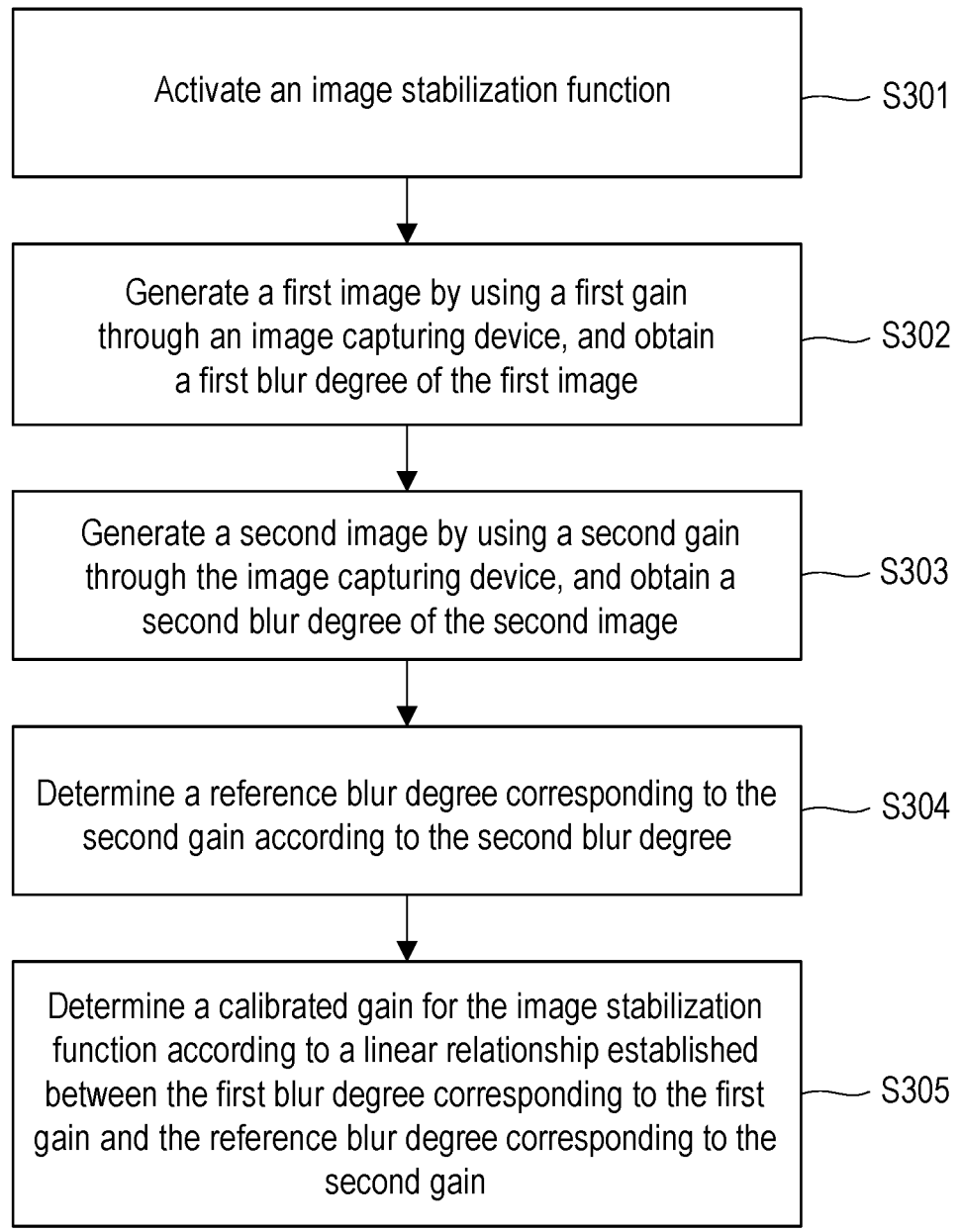
FIG. 3 is a flow chart illustrating a gain calibration method for an image stabilization function according to an embodiment of the disclosure.

FIG. 3 is a flow chart illustrating the gain calibration method for the image stabilization function according to an embodiment of the disclosure. Referring to FIG. 3, the method of this embodiment may be executed by the electronic device 100 shown in FIG. 1 and FIG. 2. The details of each operation in FIG. 3 will be described below with components shown in FIG. 1 and FIG. 2.

In Step S301, the processor 120 activates the image stabilization function. The image stabilization functions include the OIS function, the EIS function, or a combination thereof.

In Step S302, the processor 120 generates a first image by using a first gain through the image capturing device 110, and obtains a first blur degree of the first image. Next, in Step S303, the processor 120 generates a second image by using a second gain through the image capturing device 110, and obtains a second blur degree of the second image.

Specifically, when the image capturing device 110 is in a vibration state and the image stabilization function is activated, the processor 120 sequentially generates the first image and the second image respectively by using the first gain and the second gain through the image capturing device 110. In detail, when the image stabilization function is activated, the first gain and the second gain may respectively be used to adjust the sensing data output by the sensor 130. In some embodiments, the first gain includes a first gyro gain, and the second gain includes a second gyro gain. That is to say, the first gain and the second gain may also be referred to as angular velocity gains. In some embodiments, the angular velocity gain may be used to amplify or reduce an angular velocity output by the sensor 130, so that the processor 130 may perform the image stabilization function according to an angular velocity adjusted by the angular velocity gain.

In some embodiments, the processor 120 may determine the first gain and the second gain according to a preset gain. The preset gain is between the first gain and the second gain. The preset gain may be recorded in a storage device of the electronic device 100. For example, the preset gain may be a preset value pre-programmed by a manufacturer of the image capturing device 110 into a storage circuit in the image capturing device 110.

In some embodiments, the processor 120 may add a first positive number to the preset gain to obtain the first gain, and subtract a second positive number from the preset gain to obtain the second gain. In some embodiments, the processor 120 may subtract the first positive number from the preset gain to obtain the first gain, and add the preset gain to the second positive number to obtain the second gain. It should be noted that the first positive number may be different from or the same as the second positive number.

In addition, the processor 120 calculates the first blur degree of the first image and the second blur degree of the second image respectively. The processor 120 may obtain the first blur degree and the second blur degree according to imaging states of the test pattern T1 in the first image and the second image respectively. In some embodiments, the processor 120 may obtain the first blur degree according to an imaging size (such as a line width, a circle diameter, or a rectangle side length) of the test pattern T1 in the first image, and obtain the second blur degree according to an imaging size of the test pattern T1 in the second image. It may be known that the lower the blur degree of the captured image, the better the image stabilization effect.

In some embodiments, the first blur degree includes a first pixel shift amount, and the second blur degree includes a second pixel shift amount. In detail, the processor 120 may obtain the first pixel shift amount according to a contour displacement degree of the test pattern T1 in the first image, and obtain the second pixel shift amount according to a contour displacement degree of the test pattern T1 in the second image.

Figure 4:
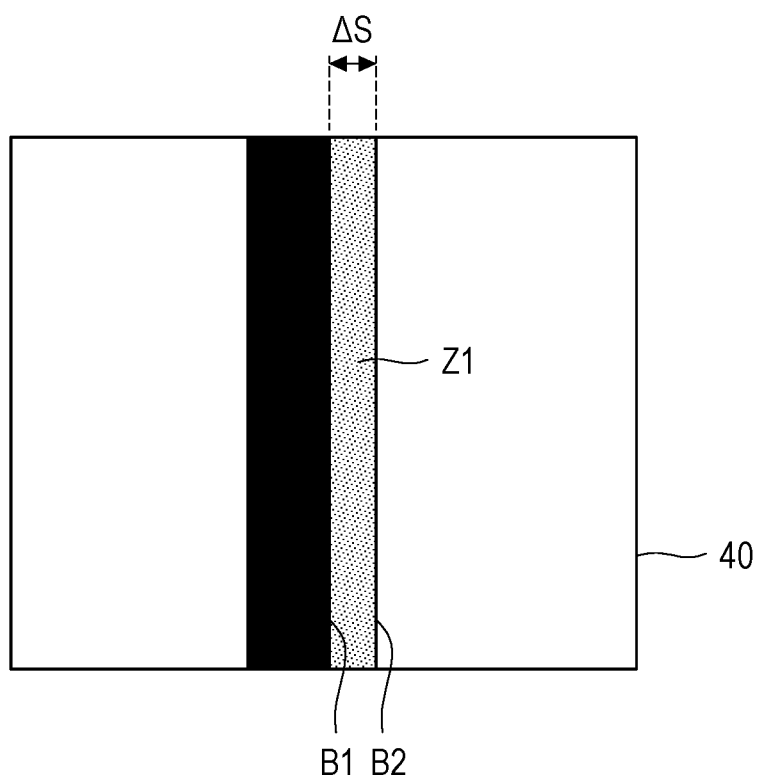
FIG. 4 is a schematic diagram illustrating calculating a blur degree according to an embodiment of the disclosure.

For example, referring to FIG. 4, the test pattern T1 includes a vertical black line as an example for illustration, but the disclosure is not limited thereto. When the image capturing device 110 is in the vibration state and the image stabilization function is activated, the processor 120 captures a first image 40 through the image capturing device 110 by using the first gain. In response to the vibration of the image capturing device 110, a gray area Z1 appears in an imaging of the test pattern T1 in the first image 40. The processor 120 may calculate a distance between a left boundary B1 and a right boundary B2 of the gray area Z1 to obtain a first pixel shift amount ΔS (unit: pixel). In addition, the processor 120 may also calculate the second pixel shift amount based on the second image in the same manner.

Next, in Step S304, the processor 120 determines a reference blur degree corresponding to the second gain according to the second blur degree. It should be noted that the first blur degree and the second blur degree calculated by the processor 120 may both be values greater than 0. In some embodiments, the reference blur degree may be a negative number, and an absolute value of the reference blur degree is equal to the second blur degree. For example, if the second blur degree is "10", then the reference blur degree may be "−10". Alternatively, in some embodiments, the reference blur degree is a negative number, and a difference between the absolute value of the reference blur degree and the second blur degree is smaller than a tolerance value. In some embodiments, the first gain may be greater than the second gain. Alternatively, in other embodiments, the second gain may be greater than the first gain.

In Step S305, the processor 120 determines a calibrated gain for the image stabilization function according to a linear relationship established between the first blur degree corresponding to the first gain and the reference blur degree corresponding to the second gain. Specifically, the gain for the image stabilization function has a linear relationship with a blur degree of the captured image within a certain value range. Based on this feature, the processor 120 may estimate a calibrated gain corresponding to a minimum blur level (e.g., 0) according to a connection line between the first blur degree corresponding to the first gain and the reference blur degree corresponding to the second gain.

In some embodiments, the processor 120 may generate a linear function according to the first blur degree corresponding to the first gain and the reference blur degree corresponding to the second gain. A slope of the linear function may be positive or negative. Afterward, the processor 120 obtains the calibrated gain for the image stabilization function according to an intersection point of the linear function and a constant function. In some embodiments, a constant of the constant function is 0. That is, the processor 120 may obtain the calibrated gain according to the connection line and an intersection point of an axis (e.g., an X-axis) between the first blur degree corresponding to the first gain and the reference blur degree corresponding to the second gain.

In some embodiments, the processor 120 may record the calibrated gain in the storage device. The storage device is, for example, an electronically erasable rewritable read-only memory (EEPROM) connected to an image signal processor (ISP), but the disclosure is not limited thereto. That is to say, after completing the gain calibration for the image stabilization function, the processor 120 may perform the image stabilization function according to the calibrated gain in the storage device, so as to compensate for the vibration of the electronic device 100 and generate a clear image.

It should be noted that, the above-mentioned embodiment is illustrated by taking the processor 120 to execute the operations in FIG. 3 as an example, but each operation in FIG. 3 may also be implemented as multiple program codes or circuits, and the disclosure is not limited thereto.

Figure 5:
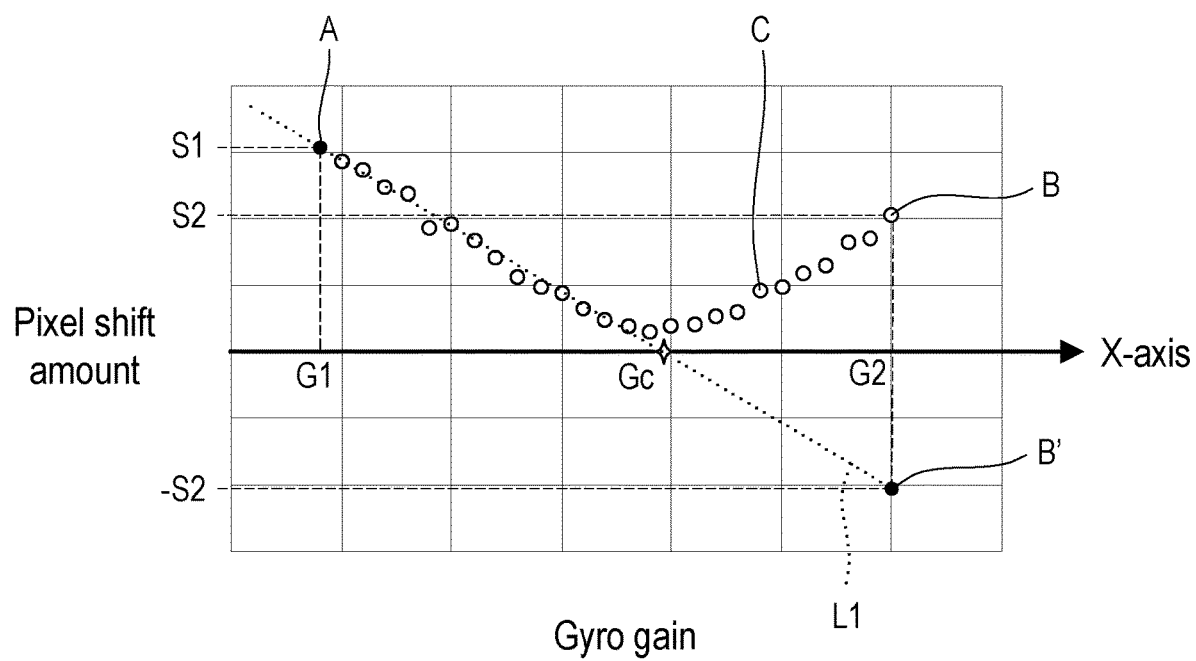
FIG. 5 is a schematic diagram illustrating a corresponding relationship between a gyro gain and a pixel shift amount according to an embodiment of the disclosure.

In addition, in order to make the concept of the disclosure more comprehensible, the following description will be supplemented with FIG. 5. However, FIG. 5 is only an example for illustrating the disclosure, and is not intended to limit the disclosure. It should be noted that, FIG. 5 is illustrated by taking the first gain, the second gain, and the calibrated gain as the gyro gains respectively, and the blur degree as the pixel shift amount. Please refer to FIG. 5, which is a schematic diagram illustrating a corresponding relationship between the gyro gain and the pixel shift amount according to an embodiment of the disclosure.

It should be noted that, if a traditional calibration process is performed, it is necessary to measure or calculate multiple pixel shift amounts for multiple gyro gains one by one, so as to obtain multiple points as shown in FIG. 5 (such as point A, point B, point C and other points without reference numerals). Observing these points, we may know that a gyro gain value used for the image stabilization function has a positive linear relationship and a negative linear relationship with the pixel shift amount of the captured image within a specific value range. Based on this feature, the processor 120 may obtain a calibrated gyro gain according to the following description.

When the image capturing device 110 is in the vibration state and the image stabilization function is activated, the processor 120 captures the first image by using a first gyro gain "G1" through the image capturing device 110, and obtains a first pixel shift amount "S1" corresponding to the first gyro gain "G1". That is, the processor 120 may obtain a point A whose coordinate position is (G1, S1).

In addition, when the image capturing device 110 is in the vibration state and the image stabilization function is activated, the processor 120 captures the second image by using a second gyro gain "G2" through the image capturing device 110, and obtains a second pixel shift amount "S2" corresponding to the second gyro gain "G2". That is, the processor 120 may obtain a point B whose coordinate position is (G2, S2). Afterward, the processor 120 may obtain a reference pixel shift amount "−S2" according to the second pixel shift amount "S2", so as to obtain the reference pixel shift amount "−S2" corresponding to the second gyro gain "G2". That is, the processor 120 may obtain a point B' symmetrical to the point B of the X-axis. A coordinate position of the point B' is (G2,−S2). Afterward, the processor 120 may obtain a calibrated gyro gain "Gc" according to an intersection point of a connection line L1 between the point A and the point B' and the X-axis.

It should be added that FIG. 5 uses an example where the second gain (i.e., the second gyro gain "G2") is greater than the first gain (i.e., the first gyro gain "G1") for illustration.

However, in other embodiments, the second gain may be smaller than the first gain, which also belongs to the protection scope of the disclosure. Persons skilled in the art should be able to deduce the embodiment in which the second gain is smaller than the first gain by themselves after referring to the above explanations, so details will not be repeated here.

It may be seen that compared with the traditional global search method that requires a large number of gyro gains to search for the best gyro gain, the number of gyro gains that need to be tested in the embodiment of the disclosure is greatly reduced, thus greatly reducing the time required for the gain calibration process for the image stabilization function.

In some embodiments, the calibrated gain may be used for the OIS function. In another embodiment, the calibrated gain may be used for the EIS function. The calibrated gain may be used to match a sensing value output by the sensor 130 to determine a vibration amplitude of the image capturing device 110. Therefore, the processor 120 may perform the OIS function or the EIS function according to the vibration amplitude of the image capturing device 110 to generate the clear image.

Figure 6:
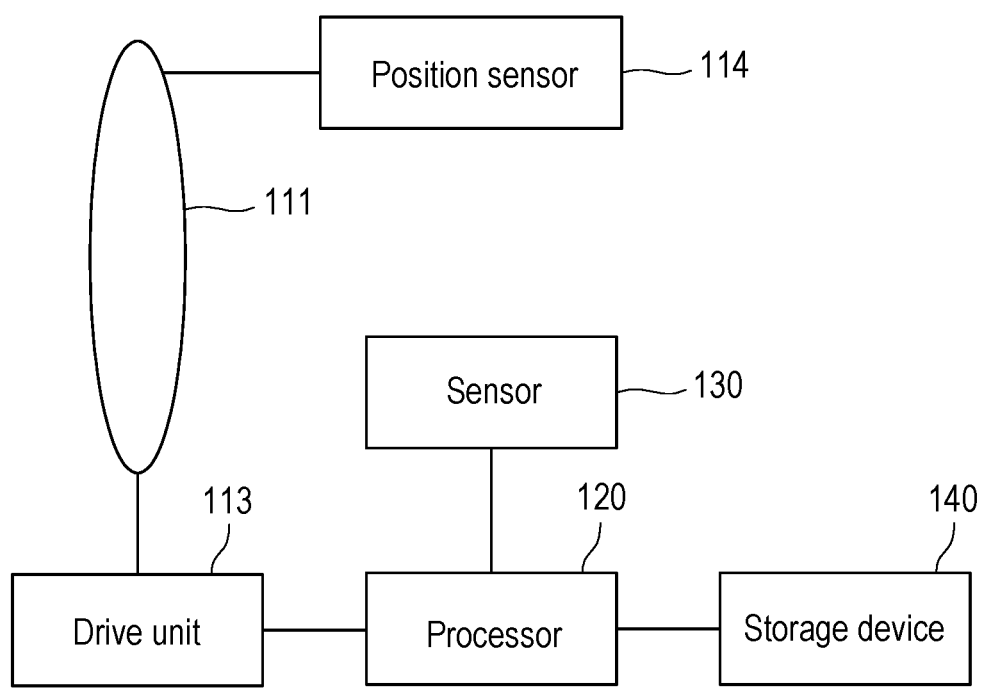
FIG. 6 is a schematic diagram illustrating an optical image stabilization system according to an embodiment of the disclosure.

Referring to FIG. 6, a drive unit 113 is connected to the lens 111 to move the lens 111 according to a control signal received from the processor 120. A change of the position of the lens 111 may be detected by a position sensor 114 accordingly. In some embodiments, the position sensor 114 may be implemented by one or more hall elements. The image captured by the image capturing device 110 may be kept stable under various motion states such as hand vibration, head shaking, and vehicle vibration by controlling the drive unit 113 to adjust the position of the lens 111 in different axes. In this way, the OIS function may be realized through the cooperation of the processor 120, the sensor 130, and the drive unit 113. The drive unit 113 is, for example, a voice coil motor or a micro electro-mechanical system (MEMS) or the like.

More specifically, the storage device 140 may record the calibrated gain generated according to the content of the above-mentioned embodiments. The sensor 130 may output the sensing data to the processor 120, and the processor 120 may use the calibrated gain to adjust the sensing data. Afterward, the processor 120 may calculate a compensation movement amount of the lens 111 in different axes according to adjusted sensing data. Therefore, the processor 120 may control the drive unit 113 to adjust the positions of the lens 111 in different axes according to the compensation movement amount, so as to realize the vibration compensation, thereby alleviating the image blur caused by the vibration.

In summary, in the embodiment of the disclosure, when the image stabilization function is activated, the calibrated gain may be determined by using the image blur degree corresponding to the first gain and the image blur degree corresponding to the second gain. In this way, the calibrated gain may be used to obtain a good image stabilization effect, thereby improving the image quality. In addition, the operation steps of the gain calibration for the image stabilization function can be greatly simplified, thereby the gain calibration efficiency is greatly improved.

Although the disclosure has been described above with embodiments, the embodiments are not intended to limit the disclosure. Persons with ordinary knowledge in the technical field may make some modifications and modifications without departing from the spirit and scope of the disclosure. The scope of protection of the disclosure should be defined by the appended claims.

What is claimed is:

1. A gain calibration method for an image stabilization function is used for an electronic device comprising an image capturing device, the method comprising:
   activating the image stabilization function;
   generating a first image by using a first gain through the image capturing device, and obtaining a first blur degree of the first image;
   generating a second image by using a second gain through the image capturing device, and
   obtaining a second blur degree of the second image, wherein the first blur degree comprises a first pixel shift amount, and the second blur degree comprises a second pixel shift amount;
   determining a reference blur degree corresponding to the second gain according to the second blur degree; and
   determining a calibrated gain for the image stabilization function according to a linear relationship established between the first blur degree corresponding to the first gain and the reference blur degree corresponding to the second gain.

2. The gain calibration method for the image stabilization function according to claim 1, wherein the reference blur degree is a negative number, and an absolute value of the reference blur degree is equal to the second blur degree.

3. The gain calibration method for the image stabilization function according to claim 1, further comprising:
   determining the first gain and the second gain according to a preset gain, wherein the preset gain is between the first gain and the second gain.

4. The gain calibration method for the image stabilization function according to claim 1, wherein determining the calibrated gain for the image stabilization function according to the linear relationship established between the first blur degree corresponding to the first gain and the reference blur degree corresponding to the second gain comprises:
   generating a linear function according to the first blur degree corresponding to the first gain and the reference blur degree corresponding to the second gain; and
   obtaining the calibrated gain for the image stabilization function according to an intersection point of the linear function and a constant function.

5. The gain calibration method for the image stabilization function according to claim 4, wherein a constant of the constant function is 0.

6. The gain calibration method for the image stabilization function according to claim 1, further comprising:
   recording the calibrated gain in a storage device.

7. The gain calibration method for the image stabilization function according to claim 1, wherein the image stabilization function comprises an optical image stabilization (OIS) function or an electric image stabilization (EIS) function.

8. An electronic device, comprising:
   an image capturing device; and
   a processor coupled to the image capturing device and configured to:
   activate an image stabilization function;
   generate a first image by using a first gain through the image capturing device, and obtain a first blur degree of the first image;
   generate a second image by using a second gain through the image capturing device, and obtain a second blur degree of the second image, wherein the first blur degree comprises a first pixel shift amount, and the second blur degree comprises a second pixel shift amount;

determine a reference blur degree corresponding to the second gain according to the second blur degree; and determine a calibrated gain for the image stabilization function according to a linear relationship established between the first blur degree corresponding to the first gain and the reference blur degree corresponding to the second gain.

9. The electronic device according to claim 8, wherein the reference blur degree is a negative number, and an absolute value of the reference blur degree is equal to the second blur degree.

10. The electronic device according to claim 8, wherein the processor is further configured to:

determine the first gain and the second gain according to a preset gain, wherein the preset gain is between the first gain and the second gain.

11. The electronic device according to claim 8, wherein the processor is further configured to:

generate a linear function according to the first blur degree corresponding to the first gain and the reference blur degree corresponding to the second gain; and obtain the calibrated gain for the image stabilization function according to an intersection point of the linear function and a constant function.

12. The electronic device according to claim 11, wherein a constant of the constant function is 0.

13. The electronic device according to claim 8, wherein the processor is further configured to:

record the calibrated gain in a storage device.

14. The electronic device according to claim 8, wherein the image stabilization function comprises an optical image stabilization (OIS) function or an electric image stabilization (EIS) function.

15. An electronic device, comprising:

an image capturing device; and a processor coupled to the image capturing device and configured to:

activate an image stabilization function;

generate a first image by using a first gain through the image capturing device, and obtain a first blur degree of the first image;

generate a second image by using a second gain through the image capturing device, and obtain a second blur degree of the second image;

determine a reference blur degree corresponding to the second gain according to the second blur degree, wherein the reference blur degree is a negative number, and an absolute value of the reference blur degree is equal to the second blur degree; and determine a calibrated gain for the image stabilization function according to a linear relationship established between the first blur degree corresponding to the first gain and the reference blur degree corresponding to the second gain.

\* \* \* \* \*